Figure 1:
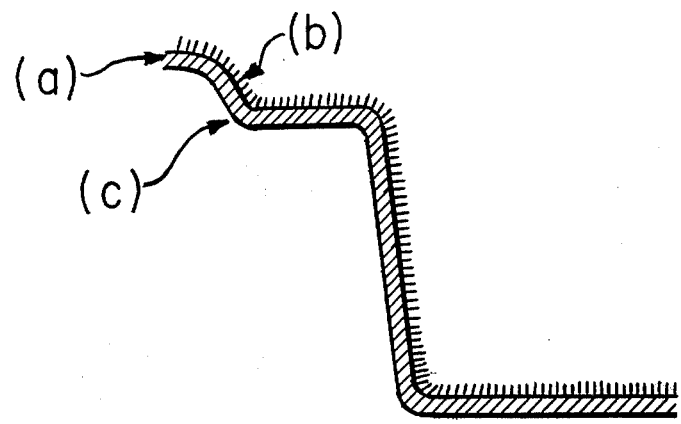

United States Patent [19]

Hartmann et al.

[11] 4,169,176
[45] Sep. 25, 1979

[54] PROCESS FOR THE MANUFACTURE OF HEAT SHAPED AUTOMOBILE CARPET

[75] Inventors: Ludwig Hartmann; Ivo Ruzek, both of Kaiserslautern, Fed. Rep. of Germany

[73] Assignee: Firma Carl Freudenberg, Weinheim, Fed. Rep. of Germany

[21] Appl. No.: 947,288

[22] Filed: Sep. 29, 1978

[30] Foreign Application Priority Data

Aug. 5, 1978 [DE] Fed. Rep. of Germany ....... 2834473

[51] Int. Cl.$^2$ .............................................. B32B 27/34
[52] U.S. Cl. ........................................ 428/95; 428/96; 428/286; 428/287; 428/288; 428/296; 156/72; 156/306
[58] Field of Search .................. 428/95, 96, 288, 296, 428/286, 287; 156/72, 306

[56] References Cited

U.S. PATENT DOCUMENTS 4,093,763  6/1978  Hartmann ................ 428/95

*Primary Examiner*—Marion E. McCamish
*Attorney, Agent, or Firm*—Sprung, Felfe, Horn, Lynch & Kramer

[57] ABSTRACT

In the manufacture of a shaped automobile carpet in which a spun nonwoven-fabric backing composed of two dissimilar types of polyester filaments is tufted, then provided on its back with a layer of a polymeric dispersion binder, and shaped in heated state, the improvement which comprises bonding to the underside of the carpet before shaping a spun nonwoven fabric having isotropic strength properties and a weight per unit area of about 20 to 60 g/m$^2$. Advantageously, the spun nonwoven fabric is bonded to the underside by a layer of sintered polyethylene powder. Such carpet shows less spacing than heretofore between the tufts in critical zones of curvature.

8 Claims, 2 Drawing Figures

PROCESS FOR THE MANUFACTURE OF HEAT SHAPED AUTOMOBILE CARPET

The invention relates to a process for the manufacture of an automobile carpet capable of being shaped in the heated state in which a spun nonwoven-fabric backing composed of two dissimilar types of polyester filaments is tufted and then provided on the back with a layer of a polymer dispersion binder and, if desired, with a further layer of polyethylene.

From German Pat. No. 22 40 437, a process for the manufacture of high-strength and dimensionally stable spun nonwoven fabrics is known which is designed to be used particularly in the manufacture of tufted carpets. Tufted carpets obtained by the use of such spun nonwovens have very good wearing properties so long as they are used flat. Ho-ever, unsatisfactory wearing properties and an unsatisfactory appearance manifest themselves in a most disturbing manner when the materials are shaped three-dimensionally, for example, for use as foot-space lining of motor vehicles. Particularly in the area of overstretched outer corners a marked thinning out of the pile density becomes observable.

Another problem in the manufacture of carpets for such applications stems from the desire for widely varying pile densities due to different types of automobiles. The pile density is a function particularly of the spacing of the pile loops contained in the backing material for the tufts. Since these loops are inserted mechanically by means of needles, closer spacing entails considerable mechanical stresses for the backing material. Especially with the high pile densities desired to satisfy demanding requirements, the deep-drawing properties therefore are generally most unsatisfactory.

The invention has as its object to modify the process outlined above in such a way that the carpet base obtained has good deep-drawing properties.

This object is accomplished in accordance with the invention in that a spun nonwoven fabric having isotropic strength properties and a weight per unit area of about 20 to 60 g/m² is adhesive-bonded onto the back of the automobile carpet before it is shaped. The use of a polyethylene-powder layer has been found to be particularly advantageous with regard to such bonding. In an advantageous variant, the spun nonwoven fabric consists of polyamide fibers bonded with bonding agent. Apart from this, good properties are secured when a spun nonwoven fabric is used whose fibers are bonded to one another by embedding binding filaments or a bonding agent.

Figure 2:
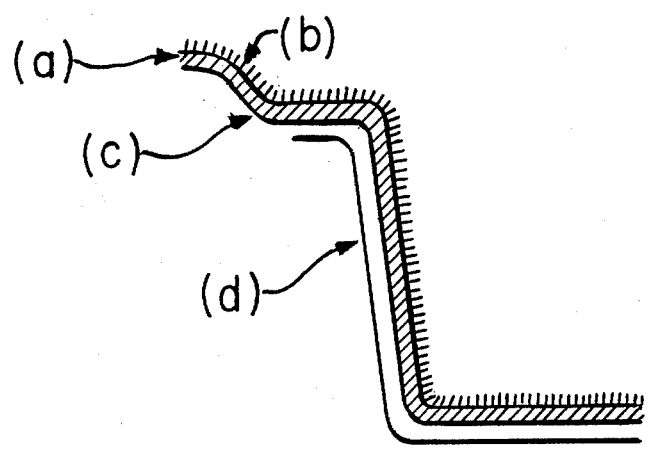

The invention will be further described with reference to the accompanying drawings wherein:

FIG. 1 is a schematic vertical section through one embodiment of a carpet in accordance with the present invention; and FIG. 2 is a similar view through a second embodiment.

Referring now more particularly to the drawing, in FIG. 1, the layer (a) represents the spun nonwoven backing consisting of two dissimilar polyester filaments, (b) the loops of the pile yarn projecting from the surface, and (c) the back lining consisting of a spun nonwoven fabric that is laminated directly to the back of the tufted spun nonwoven backing.

FIG. 2 shows an improvement embodiment in which there is first applied to the back of the spun nonwoven-fabric carpet a layer (d) of a sintered polyethylene powder, and then the laminated spun nonwoven layer (c).

Automobile carpets manufactured by the process in accordance with the invention exhibit an exceptionally balanced behavior even with widely differing pile densities. In view of the low weight per unit area of the spun nonwoven layer laminated to the back, by comparison to the spun nonwoven backing used, this is a quite unexpected result. Surprisingly, the use of heavier spun nonwovens for lamination to the back of the nonwoven backing will not result in an improvement of the mechanical properties.

The use of the process in accordance with the invention does not pose any particular technical difficulties, and the process lends itself particularly to mass production. The improvement secured in the shaping behavior permits the formation of extreme geometrical shapes even with carpet qualities having a high pile density.

The invention is further described in the following illustrative examples:

EXAMPLE 1

A spun nonwoven polyester fabric in accordance with German Pat. No. 22 40 437, Example 1, was processed on a tufting machine at a cut pile setting. The tufting machine had 31.5 needles per 10 cm (⅛ inch gauge) and the number of insertions was 30 tufts per 10 cm.

The carpet was then dyed, dried and precoated on the back with an acrylate dispersion binder, which resulted in an increase of the weight per unit area by about 60 g/m². Onto this layer there was then applied a polyethylene layer having a weight per unit area of 440 g/m² to which in turn a spun nonwoven polyamide fabric bonded with bonding agent and weighing 20 g/m² was laminated.

The carpet was then placed in a forming die at a temperature of 137° C. The die had a cube-shaped punch with an edge length of 100 mm. Upon completion of forming, adjacent rows of tufts were found to be spaced 6 mm apart at the sharp edges.

By comparison, in a comparison material composed in exactly the same manner and lacking only the rear nonwoven layer, the rows of tufts were spaced 9 mm apart.

EXAMPLE 2

Exactly the same procedure was used as in Example 1. For lamination a spun nonwoven polyester fabric having a weight per unit area of 50 g/m² was used which itself had deep-drawing capabilities.

After shaping, the rows of tufts in the critical zones were found to be spaced from 4 to 4.5 mm apart. The rows of tufts of the unlaminated comparison material were spaced 9 mm apart.

It will be appreciated that the instant specification and examples are set forth by way of illustration and not limitation, and that various modifications and changes may be made without departing from the spirit and scope of the present invention.

What is claimed is:

1. In the manufacture of a shaped automobile carpet in which a spun nonwoven-fabric backing composed of two dissimilar types of polyester filaments is tufted, then provided on its back with a layer of a polymeric dispersion binder, and shaped in heated state, the improvement which comprises bonding to the underside of the carpet before shaping a spun nonwoven fabric having isotropic strength properties and a weight per unit area of about 20 to 60 g/m².

2. A process according to claim 1, wherein the spun nonwoven fabric is composed of polyamide fibers bonded to one another with a bonding agent.

3. A process according to claim 1, wherein the spun nonwoven fabric is composed of polyester filaments bonded to each other with binding threads.

4. A process according to claim 1, wherein the spun nonwoven fabric is composed of polyester filaments bonded to one another by a bonding agent.

5. A process according to claim 1, wherein the spun nonwoven fabric is bonded to the underside by a layer of sintered polyethylene powder.

6. A process according to claim 5, wherein the spun nonwoven fabric is composed of nylon or polyester fibers or filaments.

7. A shaped automobile carpet produced by the process of claim 6.

8. A shaped automobile carpet produced by the process of claim 1.